(No Model.)
L. A. RITES.
CHEESE PRESS OR MOLD.
No. 296,064. Patented Apr. 1, 1884.
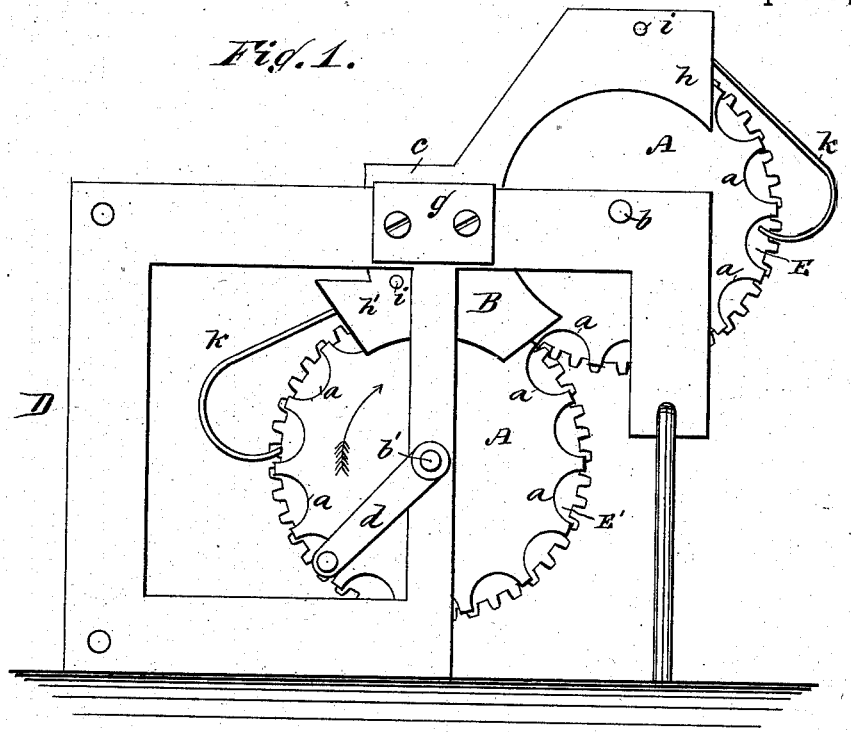
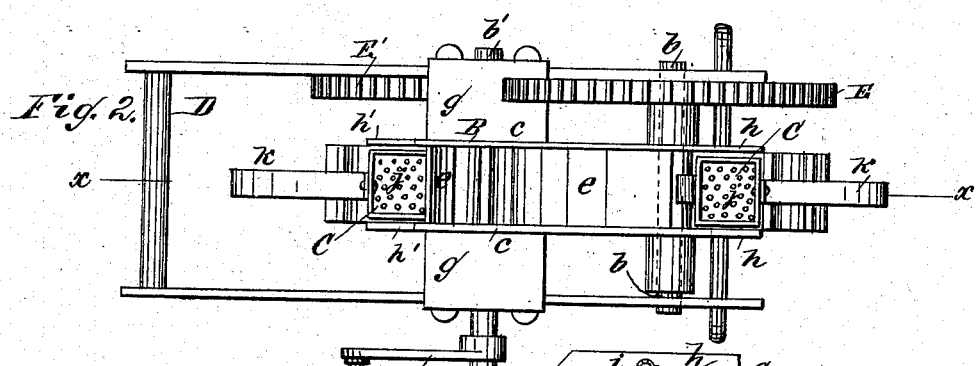
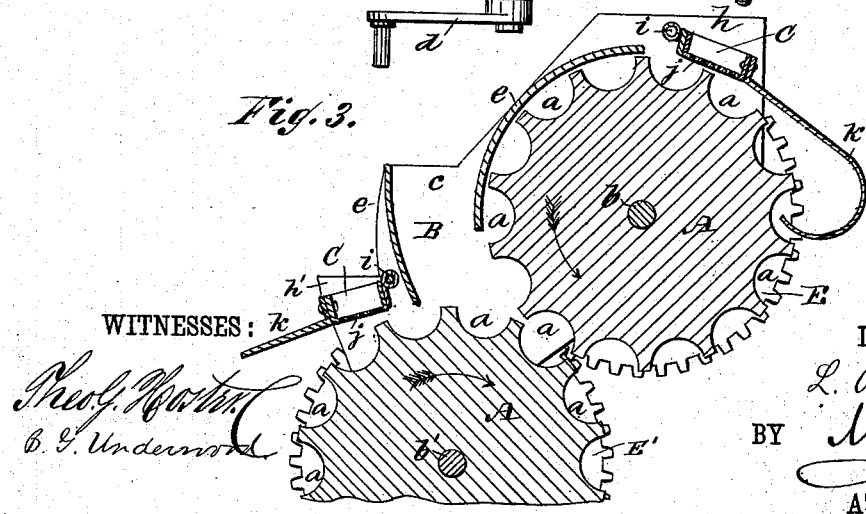
WITNESSES:
INVENTOR:
L. A. Rites
BY Munn & Co
ATTORNEYS.

UNITED STATES PATENT OFFICE.

LEWIS ANDREW RITES, OF CHESTER, NEW YORK.

CHEESE PRESS OR MOLD.

SPECIFICATION forming part of Letters Patent No. 296,064, dated April 1, 1884.

Application filed August 2, 1883. (No model.)

*To all whom it may concern:*

Be it known that I, LEWIS A. RITES, of Chester, in the county of Orange and State of New York, have invented a new and Improved Cheese Press or Mold, of which the following is a full, clear, and exact description.

The object of my invention is to provide a machine for compressing cheese-curd, the machine being especially adapted for making what is known as "Neufchâtel cheese," or other small cheese.

My invention consists of two correspondingly-recessed compressing-rollers arranged diagonally to each other in the frame, to facilitate the feeding in of the curd and the dropping out of the compressed rolls.

The invention further consists of a hopper formed of side plates and curved front and top plates, in combination with the said recessed compressing-rollers.

In making Neufchâtel or similar cheese it is the usual practice to salt the rolls upon the outside before wrapping or putting them up in packages for sale. To accomplish this final salting of the rolls, I provide suitable salt-trays with perforated bottoms for distributing salt in the recesses of the compressing-rollers, and these trays constitute a principal feature of my invention.

The invention also consists of the means whereby the salt-trays are given a pivotal or jarring motion for distributing the salt, and also of the construction, arrangement, and combination of parts, all as hereinafter fully described, and pointed out in the claims.

Reference is to be had to the accompanying drawings, forming part of this specification, in which similar letters of reference indicate corresponding parts in all the figures.

Figure 1 is a side elevation of my new and improved cheese press or mold. Fig. 2 is a plan view of the same. Fig. 3 is a sectional elevation taken on the line $x\ x$ of Fig. 2.

A A represent the compressing-rollers; B, the hopper, and C C the salt-trays. The rollers are formed with the corresponding recesses, $a\ a$, and they are placed upon the shafts $b\ b'$, which are journaled in the frame D of the apparatus, and in such manner that the peripheries of the rollers are contiguous to each other, as shown clearly in Fig. 3. The shaft $b'$ is provided with the crank $d$, by which the shaft is to be revolved. The motion given to the shaft $b'$ is imparted to the shaft $b$ by means of the large cog-wheels E E', which are fixed upon the shafts $b\ b'$, and mesh with each other, as shown clearly in Fig. 1. The hopper B is of the same width as the faces of the compressing-rollers A A, and is formed of the side plates $c\ c$ and the curved plates $e\ e$. These plates are all held in the frame D in proper position so as to feed the curd placed in the hopper to the recesses $a\ a$ in the rollers A A by means of the side plates or arms $g\ g$, which reach over the sides of the frame D, as shown in Figs. 1 and 2. The side plates $c\ c$ are formed with the upward extensions $h\ h$, as shown in Fig. 1, and also with the downward and rearward extensions $h'\ h'$, and between the extensions $h\ h\ h'\ h'$ are pivoted upon the pivots $i\ i$ the salt-trays C C. These salt-trays have perforated bottoms, as shown at $j\ j$, and the trays have an up-and-down pivotal or jarring motion imparted to them for jarring the salt into recesses $a\ a$ of the compressing-rollers A A by means of the arms $k\ k$, which are downwardly curved, so that the outer ends thereof rest in contact with the peripheries of the compressing-rollers A A, and receive rapid movement from moving in and out of the recesses $a\ a$ as the rollers A A revolve. The cog-wheels E E' may be of equal size with the compressing-rollers A A, or smaller, if desired, and the rollers A A are placed upon the shafts $b\ b'$, so that their recesses $a\ a$ register with each other as the rollers revolve, so that as the rollers A A are revolved a quantity of curd will be caught from the hopper B in each set of recesses $a\ a$, and compressed therein into rolls the size of the recesses. The cheese-curd to be compressed is, as just intimated, to be placed in the hopper B, and, if found necessary, a follower may be used for forcing the curd through the hopper into the recesses $a\ a$ of the compressing-rollers. Ordinarily such follower will not be needed, as the rollers are not arranged one immediately above the other, but at an angle to each other, which arrangement facilitates the filling of the recesses. This diagonal arrangement of the rollers also facilitates the dropping out of the rolls of cheese after they have been compressed, and the salt which is distributed in the recesses

*a a* from the trays C C also tends to prevent all danger of the rolls sticking in the recesses and being carried around with rollers A A.

I do not abandon or dedicate to the public any patentable feature set forth herein and not hereinafter claimed, but reserve the right to claim the same, either in a reissue of any patent that may be granted upon this application or in any other applications for Letters Patent I may make.

Having thus fully described my invention, I claim as new and desire to secure by Letters Patent—

1. In a cheese press or mold, the combination, with the recessed compressing-rollers A A, of the hopper B, formed of the side plates *c c* and the curved plates *e e*, substantially as and for the purposes set forth.

2. The salt-trays C C, with perforated bottoms, in combination with the recessed compressing-rollers A A, substantially as described.

3. The salt-trays C C, formed with the arms *k k*, in combination with the recessed compressing-rollers A A, substantially as described.

4. The cheese-press made substantially as herein shown and described, consisting of the correspondingly-recessed compressing-rollers A A, cog-wheels E E', pivoted salt-trays C C, and hopper B, as set forth.

5. The correspondingly-recessed compressing-rollers A A for compressing the cheese, arranged diagonally to each other in the frame, to facilitate the feeding in of the curd and the dropping out of the compressed rolls, substantially as described.

LEWIS ANDREW RITES.

Witnesses:
DENNIS HAYES,
CHARLES H. GREEN.